E. T. McHUGH.
ROCKING BAR FURNACE GRATE.
APPLICATION FILED MAY 21, 1909.
972,707.
Patented Oct. 11, 1910.
3 SHEETS—SHEET 2.
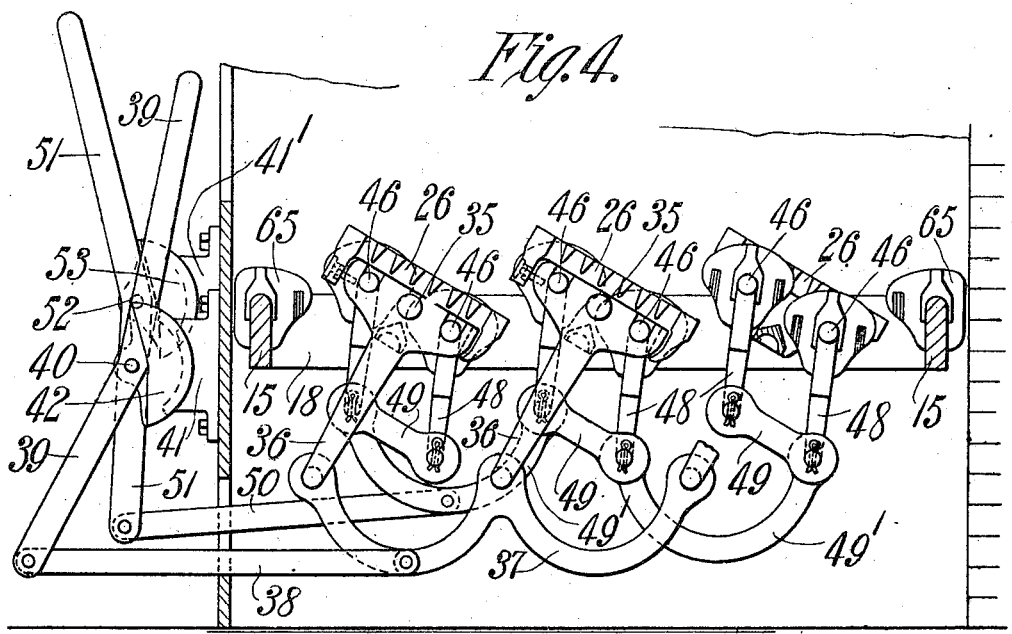
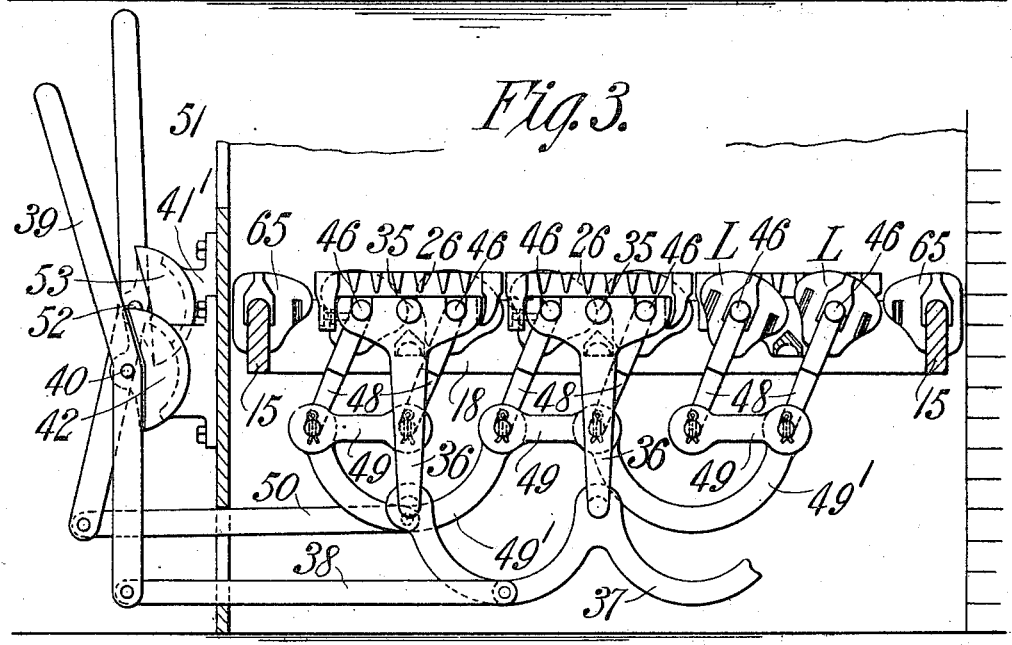
WITNESSES:
INVENTOR,
Edward T. McHugh,
BY
ATTORNEY.

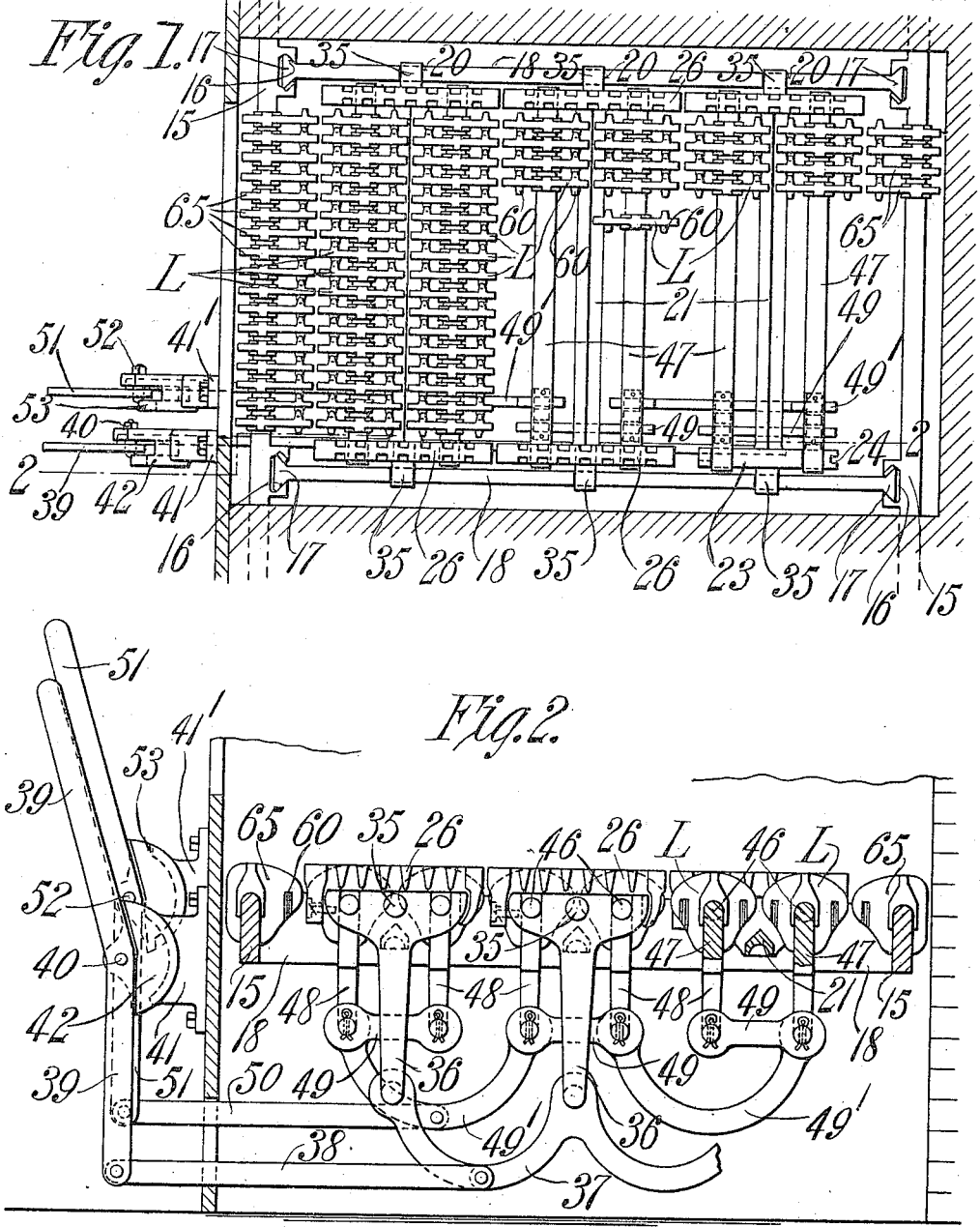

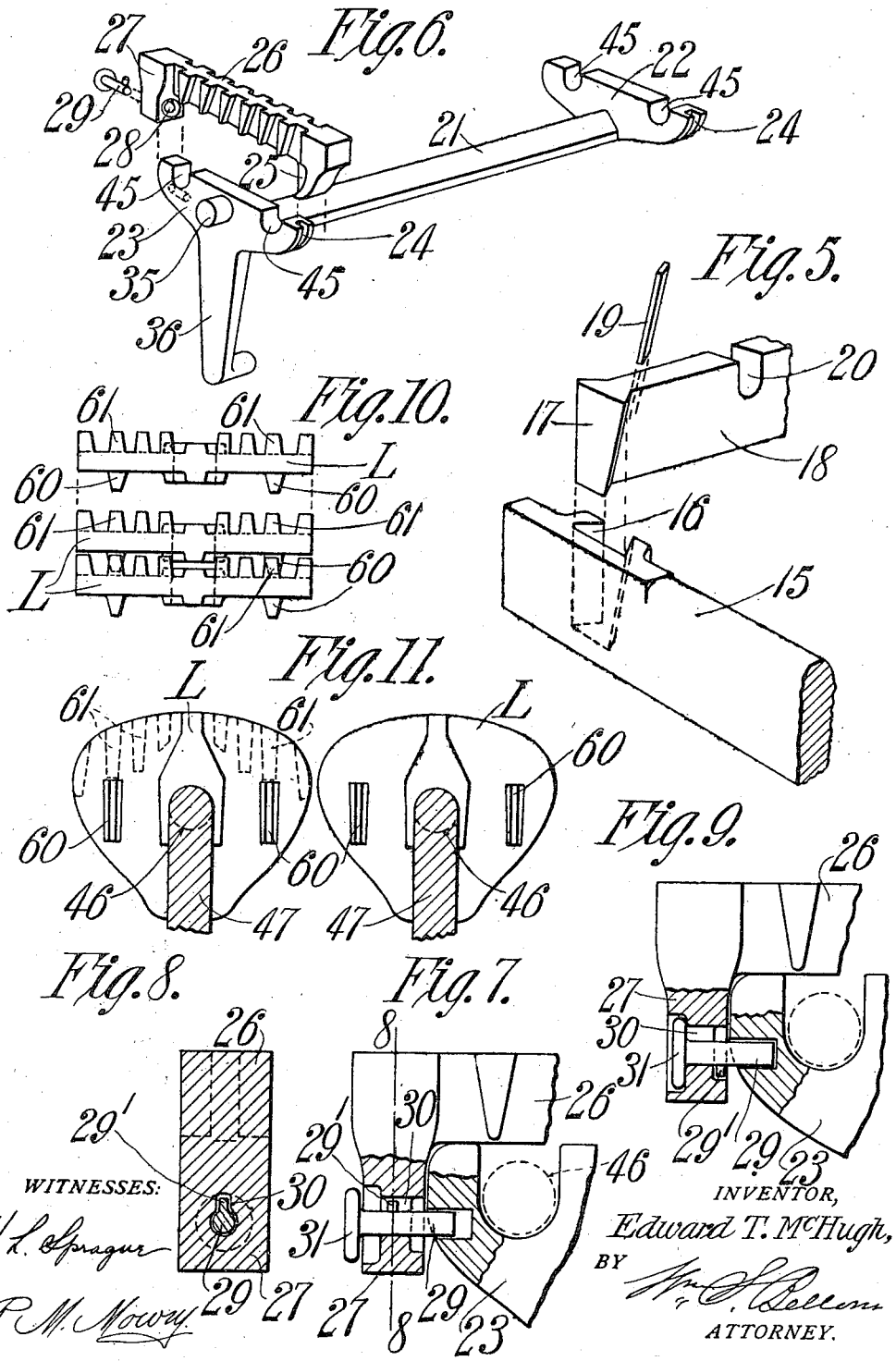

UNITED STATES PATENT OFFICE.

EDWARD T. McHUGH, OF HOLYOKE, MASSACHUSETTS.

ROCKING-BAR FURNACE-GRATE.

972,707.

Specification of Letters Patent.   Patented Oct. 11, 1910.

Application filed May 21, 1909.   Serial No. 497,541.

*To all whom it may concern:*

Be it known that I, EDWARD T. MCHUGH, a citizen of the United States of America, and resident of Holyoke, in the county of Hampden and State of Massachusetts, have invented certain new and useful Improvements in Rocking-Bar Furnace-Grates, of which the following is a full, clear, and exact description.

This invention relates to furnace grates, and more especially to that class thereof in which the grate bars can be rocked for the purpose of shaking the fire or to discharge or dump the same entirely, and it has for one of its objects the provision of a grate of this character in which the shaking operation, and the dumping operation are performed by different elements which are individually operable without interfering with one another.

The invention has, furthermore, for its object the improved construction of the grate leaves and their coöperative assemblage as will hereinafter appear.

My invention has been illustrated in the accompanying drawings, in which—

Figure 1 represents a plan view of a fire box fitted with my improved grate. Fig. 2 is a side view thereof as indicated on line 2—2 of Fig. 1. Fig. 3 is a view similar to Fig. 2 illustrating the shaking action of the rock-bars which carry the leaves. Fig. 4 represents the cradles for the rock-bars in position to dump the fire. Fig. 5 is a detail view showing the manner of connecting the principal supporting bars of the device. Fig. 6 is a perspective view of one of the cradles, together with one of the fixed leaves carried thereby. Fig. 7 shows on an enlarged scale the manner of attaching one of the end leaves to the cradle. Fig. 8 is a section on line 8—8 of Fig. 7. Fig. 9 is a view similar to Fig. 7 showing the leaf locked to the cradle. Fig. 10 illustrates a series of adjacent leaves in plan view, and Fig. 11 shows a pair of leaves on a pair of adjacent rock-bars to emphasize the shape of the top of said leaves and to illustrate their coöperative feature as will be hereinafter described.

Briefly stated, my improved grate comprises a rectangular frame on which a series of cradles are pivotally supported for simultaneous rocking action. Each of these cradles supports a plurality of rock-bars which in turn carry the leaves, these rock-bars being cojointly operable by a mechanism which is independent from that which rocks the cradles so that two distinct results are obtained.

Referring to Fig. 1 of the drawings, the numeral 15 denotes a pair of end bars which are set into the masonry of the fire pot. Each of the end bars has near its ends tapered dovetailed recesses 16 (see also Fig. 5) adapted to receive the corresponding ends 17 of side bars 18 which may be locked in place by keys 19 and which are provided with slots 20 for movably supporting the cradles of the grate.

The construction of the cradle is clearly illustrated in Fig. 6 in which 21 denotes a bar extending across the fire pot and having at its ends heads 22, 23, both heads being provided with grooves 24 adapted to receive webs 25 of what may be preferably termed end leaves 26 which latter are also provided with downwardly projecting end-portions 27 having apertures 28 to receive lock-pins 29. The particular method of securing the end leaves 26 to the cradles is clearly shown in Figs. 7 and 8 in which it will be seen that the pin 29 has a wing 29' which can pass through a slot 30 provided therefor in the cradle, said pin 29 also having a head 31 which serves as a shoulder to limit the movement of the pin 29 in one direction while the wing 29' will serve as a means to prevent said pin 29 from pulling out of the cradle as shown in Fig. 9. From the foregoing, it will be seen that the end leaf 26 is not only held against lateral movement on the cradle head 23, but the latter will also prevent it from accidental displacement.

In the present instance the grate is shown as comprising three cradles each of which is provided with suitable trunnions 35 adapted to rest in the recesses or slots 20 above referred to. Furthermore, each cradle is provided with a downwardly projecting arm 36 whereby a rocking movement may be imparted thereto, the cradle arms 36 being connected, as for instance by a link 37 (see Fig. 4) to which motion may be given by a connector 38, the forward end of which is secured to the lower end of a lever 39 fulcrumed at 40 on a bracket 41 which is secured to the front plate of the fire box. The bracket 41 has a lock-flange 42 which is so shaped as to prevent the lever 39 from being removed from its fulcrum pin 40 except when it is in the position shown in Figs. 2 and 3, or in other words, when the cradles are in their normal and straight positions.

Each of the cradle heads 22, 23 is provided with a pair of sockets or recesses 45 adapted to receive trunnions 46 on rock-bars 47 which constitute the leaf supporting members of my improved grate and which extend between the heads 22, 23, above mentioned, of each cradle.

Each of the leaf-carrying bars 47 is provided with an arm 48, each pair of adjacent arms belonging to the same cradle being connected for coöperation by links 49, and all of said links being operable simultaneously to impart a rocking motion to the bars 47, as for instance by a connector 50, the forward end of which is secured to the lower end of a hand operable lever 51 fulcrumed at 52 on a bracket 41' similar to the bracket 41 above referred to, said bracket also having a flange 53 for preventing the removal of the lever 51 except it be substantially in the position shown in Figs. 2 and 4, or in other words, when the leaf-supporting bars are normal. It will be noted that when the rock bars are rocked by the lever 51, above referred to, and the lever 39 will remain in its normal position, a rolling motion will be established between each adjacent pair of rock-bars so as to facilitate the discharge of the fire from the leaves carried thereby. This rolling motion can be clearly seen at the right hand of Fig. 3 in which it will be observed that the curvature of the top surface of one leaf L coacts with the end portion of the adjacent leaf so as to slightly increase the distance between said leaves and thus permit the ashes to fall through without, however, affording sufficient space for the coal to be dumped by the rocking action of the leaves on the cradle. When it is desired to dump the grate, the cradles themselves are rocked in the manner shown in Fig. 4 which clearly shows a great deal of space between the several leaves supported on the cradle bars.

Attention is called to the fact that the adjacent leaves of any one of the rock bars are what may be termed "interlocked" together, this result being accomplished by virtue of projections 60 provided on one face of one leaf while the other face of the next leaf has coal-carrying teeth 61 of such length as to pass over the projections 60 above referred to so that in this manner it is a practical impossibility for any one leaf to be taken out of its place without removing the entire series preceding.

The end bars 15 carry end leaves 65 which are normally stationary but the adjacent members of which are interlocked in the same manner as the leaves on the rock bars.

I claim:—

1. In a grate, the combination with the fire pot, a frame mounted therein, a series of cradles mounted in said frame and consisting each of a bar, a pair of heads formed one at each end of said bar, a depending arm formed on one of said heads, a lever connected with said depending arms for operating the cradles, leaves having means for locking them to the heads, leaves having curved upper faces mounted in said cradles and movable thereon, a pair of arms depending from the series of leaves, connections between said bars and a lever for operating said bars whereby the curved face bars and the leaves may be operated separately for the purpose of removing the ashes or for entirely dumping the grate as circumstances require.

2. In a grate, the combination with a supporting frame, of a cradle mounted for rocking movement in said frame, said cradle having a pair of heads at its ends, each head having a groove at one end thereof and an aperture in its other end, a leaf having near one end thereof a web adapted to enter said groove and having at its other end a projection coöperating with the other end of the cradle head, a lock bolt passing through said projection and entering said aperture, means carried by said bolt for retaining the same in locked position, leaves having curved faces and being movably mounted in said cradle, and means for rocking the cradle and curved face leaves independently.

3. A grate consisting of a supporting frame, a series of cradles mounted in said frame to have a rocking action therein, said cradles each consisting of a cross bar, a pair of heads formed on said cross bar, one of said heads having a depending arm, leaves having means for engaging and securing them to the heads of the cradle, each of said heads having a pair of transverse bearings, rock bars journaled in said bearings leaves mounted on said bars, arms depending from said bars and a lever connected with said arms and a lever connected with the depending arm on each of the heads whereby the cradles may be rocked to discharge or dump the grate, or the leaves in pairs may be rocked for discharging the ashes.

Signed by me at Springfield, Mass., in presence of two subscribing witnesses.

EDWARD T. McHUGH.

Witnesses:
 WM. S. BELLOWS,
 G. R. DRISCOLL.